United States Patent
Nako et al.

(10) Patent No.: US 8,043,407 B2
(45) Date of Patent: Oct. 25, 2011

(54) WELDING SOLID WIRE

(75) Inventors: Hidenori Nako, Kobe (JP); Hiroyuki Takeda, Kobe (JP); Yoshitomi Okazaki, Kobe (JP); Kazuyuki Suenaga, Fujisawa (JP); Kohjiroh Nakanishi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/678,398

(22) PCT Filed: Oct. 2, 2008

(86) PCT No.: PCT/JP2008/067929
§ 371 (c)(1),
(2), (4) Date: Mar. 16, 2010

(87) PCT Pub. No.: WO2009/044808
PCT Pub. Date: Apr. 9, 2009

(65) Prior Publication Data
US 2010/0206130 A1      Aug. 19, 2010

(30) Foreign Application Priority Data

Oct. 5, 2007 (JP) .................................. 2007-262452
Oct. 5, 2007 (JP) .................................. 2007-262453

(51) Int. Cl.
*C22C 38/02* (2006.01)
*C22C 38/04* (2006.01)
*C22C 38/06* (2006.01)
*C22C 38/08* (2006.01)

(52) U.S. Cl. ................ 75/302; 148/24; 420/91; 420/97; 420/103; 420/112; 420/119

(58) Field of Classification Search ............ 75/302; 148/24; 420/91, 97, 103, 112, 119
See application file for complete search history.

(56) References Cited

U.S. PATENT DOCUMENTS
3,392,263 A * 7/1968 Essers et al. .......... 219/146.52
(Continued)

FOREIGN PATENT DOCUMENTS
JP       53 118241       10/1978
(Continued)

OTHER PUBLICATIONS
Machine translation of JP 2005-219061 A, published Aug. 2005.*

*Primary Examiner* — George Wyszomierski
*Assistant Examiner* — Tima M McGuthry Banks
(74) *Attorney, Agent, or Firm* — Oblon, Spivak, McClelland, Maier & Neustadt, L.L.P.

(57) ABSTRACT

It is an object of the present invention to provide a similar composition metal type welding solid wire capable of forming a welded joint having excellent cryogenic characteristics, such as ensuring a low-temperature toughness equivalent to that of the cryogenic base metal, and in addition, further having a high crack initiation resistance, and a weld metal thereof. The welding solid wire of the present invention is an iron base welding solid wire including carbon: 0.10 mass % or less (not inclusive of 0%), silicon: 0.15 mass % or less (not inclusive of 0%), nickel: 8.0 to 15.0 mass %, manganese: 0.10 to 0.80 mass %, and Al: 0.1 mass % or less (not inclusive of 0%), and oxygen in an amount of 150 ppm or less (inclusive of 0), characterized by including: a REM: 0.005 to 0.040 mass %, or chromium: 4.0 mass % or less (not inclusive of 0%).

17 Claims, 1 Drawing Sheet

U.S. PATENT DOCUMENTS 3,970,447 A * 7/1976 Lang .............................. 420/94
4,336,441 A * 6/1982 Godai et al. .......... 219/137 WM

FOREIGN PATENT DOCUMENTS

| | | | | |
|---|---|---|---|---|
| JP | 54 76452 | | 6/1979 | |
| JP | 54 121247 | | 9/1979 | |
| JP | 57 79092 | | 5/1982 | |
| JP | 57 171598 | | 10/1982 | |
| JP | 58196193 | A * | 11/1983 | |
| JP | 59010493 | A * | 1/1984 | |
| JP | 60 96395 | | 5/1985 | |
| JP | 61 15925 | | 1/1986 | |
| JP | 61 150783 | | 7/1986 | |
| JP | 09085486 | A * | 3/1997 | |
| JP | 11 138262 | | 5/1999 | |
| JP | 2005219061 | A * | 8/2005 | |

* cited by examiner

WELDING SOLID WIRE

CROSS-REFERENCE TO RELATED APPLICATIONS

The present application is a 35 U.S.C. §371 National Stage patent application of International patent application PCT/JP2008/067929, filed on Oct. 2, 2008, which claims priority to Japanese patent applications JP 2007-262453, filed on Oct. 5, 2007 and JP 2007-262452, filed on Oct. 5, 2007.

TECHNICAL FIELD

The present invention relates to an iron base welding solid wire suitable for welding of cryogenic steels including a 9% nickel steel, and a weld metal thereof. More particularly, the present invention relates to a similar composition metal type solid wire for cryogenic steel welding which forms a welded joint part excellent in cryogenic characteristics in welding aimed at a cryogenic steel, and a welded metal thereof.

BACKGROUND ART

As is well known, a 9% nickel steel is a high tensile strength steel to be used at cryogenic temperatures to −196° C. or less, and has a high proof stress and an excellent low-temperature toughness. Accordingly, the 9% nickel steel has been widely used for a storage tank of LNG, liquid nitrogen, liquid oxygen, or the like, related equipment thereof, or the like. Thus, the 9% nickel steel has an excellent cryogenic toughness. However, in order to utilize this feature, as a matter of course, the welded joint part is also required to have equivalent cryogenic characteristics.

From such background, up to now, various studies have been also made on a welding technology of a cryogenic steel, leaving many insufficient aspects from the standpoint of satisfying both the cost effectiveness and the cryogenic characteristics. For example, it can be considered as follows: when a cryogenic steel is welded using a welding wire having components similar to those of a cryogenic steel (so-called similar composition metal type wire), a welded joint excellent in cryogenic characteristic can be obtained. However, with the current welding method, a stable low-temperature toughness cannot be ensured in the as-welded state. Further, for a welded structure of a cryogenic steel, a heat treatment for recovering the toughness after completion of welding is very difficult. Accordingly, a welding wire having components similar to those of the cryogenic steel is not practical.

For this reason, for welding of a cryogenic steel, mainly, a high nickel alloy welding wire has been often used. However, a welded joint using a high nickel alloy welding wire shows an excellent toughness at −196° C. even in the as-welded state, but is much lower in tensile strength, particularly, 0.2% proof stress, than a 9% nickel steel (base metal). As a result, despite use of a 9% nickel steel as a 70-kg/mm² class high tensile strength steel, the strength of the welded joint part is low. This also forces the design stress to be accordingly reduced. In order to ensure the strength, disadvantageously, the plate thickness of the whole welded structure must be increased.

Therefore, so long as a high nickel alloy welding wire is used, the high strength of a 9% nickel steel cannot be utilized sufficiently. This imposes double economic burdens of an increase in plate thickness of the welded structure and an increase in quantity of an expensive high nickel alloy welding wire consumed. Further, with welding by a high nickel alloy, a problem of high temperature cracking inherently occurs. In addition, a large difference in components from a 9% nickel steel, which is the base metal, also creates a problem of thermal fatigue due to a difference in thermal expansion coefficient, or the like.

From the foregoing reasons, a 9% nickel steel has excellent performances as a cryogenic steel. In spite of this, in actuality, the scope of application thereof is remarkably limited.

Regarding the welding technology using a similar composition metal type welding wire similar in components to a 9% nickel steel base metal, there has been conventionally conducted a study in order to enhance the cryogenic characteristics of a welded joint part. For example, in JP-A No. 54-76452, or the like, there is disclosed a method for improving the foregoing problems by focusing attention on the chemical components of the similar composition metal type welding wire, particularly by adjusting and limiting the contents of nickel, manganese, boron, oxygen, and the like in the welding wire within the proper ranges. However, with this method, although the low-temperature toughness improvement results of the welded joint part by the Charpy impact test according to JIS-Z-3111 has been reported, the results thereof are based on evaluation by only the whole absorption energy. Thus, no effort has been made from a viewpoint of crack initiation necessary for ensuring the safety as an actual large-size welded structure. Therefore, with this method, in evaluation by only the absorption energy, a sufficient low-temperature toughness satisfying the criterion thereof is obtained. However, there has still been room for improvement on the crack initiation resistance (crack inhibiting strength) reflecting even the real crack initiation as further described later.

Whereas, in JP-A No. 53-118241 or the like, there is proposed a method in which the low-temperature toughness of the welded joint part is improved by devising how to execute welding. Namely, in this publication, there is disclosed the following method: after performing multilayer welding, the weld bead surface of the final layer is cooled to 150° C. or less, and then, the weld bead surface of the final layer is remolten with an arc from a non-consumable electrode while being shielded by an inert gas. This method is intended to achieve the following: the central part (lower layer part) of the groove can receive a proper heat treatment effect by the heat cycle during upper layer part welding, and hence the low-temperature toughness of the lower layer part is enhanced; however, the final layer cannot expect to receive the heat treatment effect; for this reason, the final layer is remolten, thereby to be applied with a heat treatment to improve the low-temperature toughness. However, this method has a problem of an increase in number of steps in executing welding. This method is limited to the improvement of the partial low-temperature toughness of only the final welded layer in the welded joint part to the end. Therefore, unfavorably, this method inherently has a problem of having a limit in improving the low-temperature toughness of the whole weld metal controlling the characteristics of the welded joint. Further, also with this method, as with the prior art technology, there have been confirmed only the low-temperature toughness improving effect by a simple Charpy impact test or COD test. There has still been room for efforts from a viewpoint of crack initiation necessary for ensuring the safety as an actual large-size welded structure.

Whereas, regarding the improvement of the low-temperature toughness of a nickel-containing steel, there is proposed a technology of shortening the time of the heat treatment of the similar composition metal weld part of the nickel-containing steel in JP-A No. 61-15925. In this publication, the low-temperature toughness is ensured by control of the carbide form and the heat treatment after welding. In this case, although the reason for addition thereof is not clear, a wire obtained by adding a REM in an amount of 0.042% or more is used in Examples. Also with this technology, as with the JP-A No. 53-118241, a heat treatment after welding is required. This entails an increase in number of steps, and further an increase in cost. Further, the study on the wire components is insufficient. Therefore, as with the prior-art technology, also with this method, there has still been room for efforts from a viewpoint of crack initiation necessary for ensuring the safety as an actual large-size welded structure.

DISCLOSURE OF THE INVENTION

Problems to be Solved by the Invention

In order to further enhance the widespread use of a cryogenic steel typified by the 9% nickel steel, the present inventors aimed to establish a welding technology capable of imparting cryogenic characteristics as excellent as those of the base metal of the cryogenic steel to the welded joint part assuming that a cryogenic steel is welded using a similar composition metal type welding wire having advantages of being low in cost burden and the like in a practical aspect as described above. Thus, the present inventors started the development thereof. Then, in the development, for evaluation of the cryogenic characteristics of the welded joint part, the present inventors introduced novel and useful evaluation viewpoints not disclosed in the related art technology using a similar composition metal type welding wire previously pointed out.

Heretofore, the safety of the welded joint part has been often evaluated by a simple Charpy impact test or CTOD test. However, when a welded structure is applied with an external force (load), first, cracking is initiated, and then, cracking propagates. For this reason, with the foregoing simple testing method, in actuality, the actual conditions of initiation and propagation of cracking have been difficult to evaluate. Under such circumstances, the present inventors recognized the following: it is important and indispensable in evaluation of the cryogenic characteristics of an actual large-size welded structure to examine and confirm the characteristics of from the start to the end of crack initiation upon application with an external force. Based on this recognition, the present inventors specifically focused attention on the instrumented Charpy impact testing method capable of separating crack initiation from the propagation process during the Charpy impact test by a load-displacement curve. Then, the present inventors decided to adopt the values of the crack initiation resistance graspable particularly with this method as the evaluation elements. This enables the evaluation of not only the conventional simple Charpy impact test results but also more detailed cryogenic characteristics appropriate to the real large-size brittle fracture strength.

The present invention was completed as a result of close study and examination from such viewpoints. The present invention resolves the foregoing conventional problems. It is an object of the present invention to provide a similar composition metal type welding solid wire capable of imparting excellent cryogenic characteristics of ensuring a low-temperature toughness equivalent to that of a cryogenic steel base metal, and in addition, having a high crack initiation resistance to the welded joint part, and a weld metal thereof.

Means for Solving the Problems

In order to solve the foregoing problems, the present invention is characterized by the following means:

(1) A welding solid wire including, carbon: 0.10 mass % or less (not inclusive of 0%), silicon: 0.15 mass % or less (not inclusive of 0%), nickel: 8.0 to 15.0 mass %, manganese: 0.10 to 0.80 mass %, and Al: 0.1 mass % or less (not inclusive of 0%), oxygen in an amount of 150 ppm or less (inclusive of 0), and the balance being Fe and inevitable impurities, characterized by including: a REM: 0.005 to 0.040 mass %.
(2) The welding solid wire according to the item (1), further including titanium: 0.10 mass % or less (not inclusive of 0%).
(3) A welding solid wire including, carbon: 0.10 mass % or less (not inclusive of 0%), silicon: 0.15 mass % or less (not inclusive of 0%), nickel: 8.0 to 15.0 mass %, and manganese: 0.10 to 0.80 mass %, oxygen in an amount of 150 ppm or less (inclusive of 0), and the balance being Fe and inevitable impurities, characterized by including: chromium: 4.0 mass % or less (not inclusive of 0%).
(4) A weld metal characterized by having been formed by using the welding solid wire according to any of the items (1) to (3).

Effect of the Invention

In accordance with the present invention, it becomes possible to provide a similar composition metal type welding solid wire capable of forming a welded joint part with cryogenic characteristics generally equivalent to those of the base metal upon welding a cryogenic steel typified by a 9% nickel steel. Particularly, by the welding solid wire of the present invention, it is possible to obtain a welded joint part holding a sufficient low-temperature toughness resulting in a high absorption energy by the Charpy impact test, and in addition, having a very high level in the measured value of the crack initiation resistance by the instrumented Charpy impact testing method. As a result of this, it is possible to form a welded joint part having excellent cryogenic characteristics appropriate to the brittle fracture phenomenon of an actual large-size welded structure.

Thus, by use of such a similar composition metal type welding solid wire of the present invention, it is possible not only to more reduce the cost of the wire itself than with a high alloy type wire, but also to clear a large economical burden due to an increase in plate thickness of the base metal steel associated with the insufficient strength of the welded joint. Further, it is also possible to resolve the problems in quality such as reduction of the thermal cracking resistance of the same welded joint part and the deterioration of the thermal fatigue characteristics due to a difference in thermal expansion coefficient. This promotes manufacturing of a welded structure including a cryogenic steel. This further enables remarkable enhancement of popularization in various applications of the cryogenic steel having excellent characteristics.

BEST MODE FOR CARRYING OUT THE INVENTION

Figure 1:
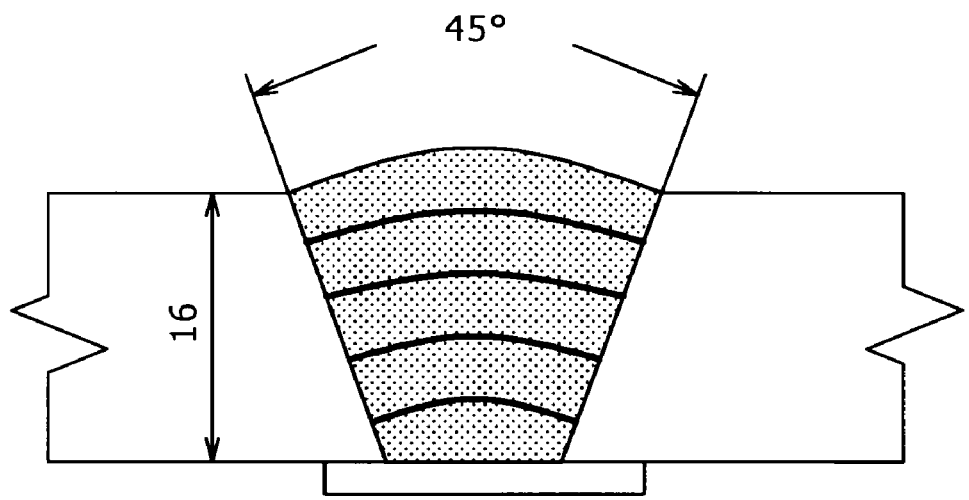
[FIG. 1] A schematic view showing the welding groove shape and the state of multilayered deposit of a weld metal of Example.

In order to achieve the foregoing object of the present invention, the present inventors pursued a study mainly on the chemical components of a similar composition metal type welding solid wire. As a result, they found the following. Nickel and manganese disclosed in JP-A No. 54-76452 are adopted as basic components, and a proper amount of a REM (rare earth element) or chromium is allowed to be included. This can provide a welded joint excellent in both characteristics of the low-temperature toughness and the crack initiation resistance. The chemical components of the welding solid wire of the present invention will be described in details below. Incidentally, the balance other than the chemical components referred to and specified below include iron and inevitable impurities.

[1. Carbon: 0.10 Mass % or Less (not Inclusive of 0%)]

Carbon is effective even in a small amount in enhancing the tensile strength. However, when carbon is contained in a large amount, the low-temperature toughness is remarkably reduced. For this reason, the upper limit of the content is set at 0.10 mass %.

[2. Silicon: 0.15 Mass % or Less (Not Inclusive of 0%)]

Silicon effectively acts on the improvement of the weldability, but deteriorates the low-temperature toughness and remarkably enhances the high-temperature cracking susceptibility. For this reason, the upper limit of the content is set at 0.15 mass %.

[3. Nickel: 8.0 to 15.0 Mass %]

Nickel is an important component in ensuring the same low-temperature toughness as that of the cryogenic steel (high nickel steel) for which the inventive wire is used. When the nickel content is less than 8.0 mass %, sufficient low-temperature toughness cannot be imparted to the welded joint. On the other hand, when the nickel content exceeds 15.0 mass %, the mechanical strength of the welded joint becomes too high, resulting in an extreme reduction of the ductility. Further, unstable residual austenite is formed, and is transformed into martensite under cryogenic temperatures, unfavorably causing a reduction of the low-temperature toughness. Therefore, the nickel content is set at 8.0 to 15.0 mass %.

[4. Manganese: 0.10 to 0.80 Mass %]

Manganese improves the weldability, and exhibits an excellent effect as a deoxidizer or a sulfur scavenger. For this reason, manganese is also an important basic component in the present invention. When the manganese content is less than 0.10 mass %, unfavorably, the weldability is remarkably reduced. On the other hand, when the manganese content exceeds 0.80 mass %, stable residual austenite becomes more likely to be formed. Thus, as with the case of nickel, the low-temperature toughness is impaired. Therefore, the manganese content is set at 0.10 to 0.80 mass %. The further preferred manganese content is 0.10 to 0.50 mass %.

[5. Oxygen: 150 ppm or Less (Inclusive of 0)]

When a REM or titanium described later is allowed to be contained, oxygen becomes essential in order to farm an objective oxide in the present invention. However, when oxygen is contained excessively in the weld metal, an increase in number density, and an increase in size due to aggregation/agglomeration are caused. Whereas, when a REM or titanium is not allowed to be contained, reaction with the manganese which is the basic component and inevitable impurities causes formation of coarse oxides in the crystal grain boundary and the like. This may impair the low-temperature toughness. Therefore, the oxygen content in the weld metal is desirably controlled to 100 ppm or less. To that end, in consideration of deoxidation during welding due to the deoxidizer element such as manganese, the REM, or titanium, the amount of oxygen contained in the welding wire should be controlled so as to be 150 ppm or less. Therefore, the upper limit of the oxygen content is set at 150 ppm.

The present invention is characterized by containing a REM or chromium in addition to the foregoing basic components. Below, the reason why a REM or chromium is added will be described in details.

[6-1. REM: 0.005 to 0.040 Mass %]

Generally, many oxides are formed in the crystal grain boundary and the like, and remarkably impair the low-temperature toughness. For this reason, it is not preferable that a large number of large oxides are formed in the weld metal. However, when oxides resulting from a reaction with a trace amount of oxygen contained in the weld metal are small in size, such oxides do not act as fracture start points, and rather function as pinning particles inhibiting the crystal grain growth during the welding solidification process or after solidification. For this reason, the oxides effectively act to enhance the strength and the toughness of the whole weld metal. The present inventors considered that there are useful oxide forming elements for improving the cryogenic characteristics of the welded joint part by dispersion of a proper amount of the fine oxide. Thus, they conducted a study and examination thereon. As a result, they confirmed that a REM is optimum, and decided to positively allow a REM to be added and contained in a welding wire. Incidentally, the reason why an oxide of a REM is kept in a dispersed state while remaining in a fine form as distinct from other oxides can be considered as follows. An oxide of a REM is bad in wettability with a molten iron alloy. Accordingly, even when an oxide of a REM is formed in the liquid phase, the oxide is less likely to agglomerate, and thereby does not grow to a larger oxide than that. Further, REM's are rare earth elements (Rare Earth Metals), and are used to generically refer to elements of La to Lu in the periodic table. In the present invention, all of these elements exhibit the equivalent effects. For this reason, elements may be appropriately selected out of REM's, to be added alone or in combination of a plurality of the elements.

The inclusion of a REM can enhance the cryogenic characteristics of the welded joint part. However, as apparent from Embodiments described later, the content thereof is required to be kept in a proper range. When the REM content is less than 0.005 mass %, there is no problem in low-temperature toughness of the welded joint part. However, the crack initiation resistance of the welded joint part, the characteristic on which attention is focused in the present invention, is insufficient. For this reason, the objective cryogenic characteristics in the present invention cannot be sufficiently ensured. On the other hand, when a REM is contained excessively, namely, when the REM content exceeds 0.040 mass %, the low-temperature toughness and the crack initiation resistance are both deteriorated. Thus, the objective cryogenic characteristics in the present invention also become unable to be sufficiently obtained. Therefore, the REM content is set at 0.005 to 0.040 mass %.

Further, in order that the welded joint is kept with both characteristics of the low-temperature toughness and the crack initiation resistance more effectively enhanced, the REM content is preferably 0.01 mass % or more, and preferably 0.035 mass % or less. The upper limit of the further preferable REM content is 0.030 mass %.

Incidentally, it is also effective to allow the welding wire to contain, in addition to the REM, titanium therein at the same time. Although not as remarkable effects as the REM, titanium is also an element exhibiting the same effects. By allowing the welding wire to contain titanium therein at the same time with the REM, it is possible to further improve the crack initiation resistance. In this case, the titanium content is preferably set at 0.10 mass % or less. This is due to the following reason: when titanium is added in an amount exceeding 0.10 mass %, the low-temperature toughness and the crack initiation resistance are both deteriorated even if the REM amount is proper. Further, in order for the titanium addition effect to be sufficiently exhibited, it is desirable that titanium is contained in an amount of 0.02 mass % or more, and preferably 0.03 mass % or more.

[6-2. Chromium: 4.0 Mass % or Less (Not Inclusive of 0%)]

In multilayer welding, the central part, i.e., the lower layer part of the groove receives a heat treatment effect by a heat cycle during the upper layer part welding. However, at this time, when the initial structure which has become a bainite or martensite structure after welding is reversely transformed into austenite, the structure of the weld metal tends to be fine. In the foregoing nickel-manganese-containing basic component system, chromium has an excellent action of reducing the transformation temperature of ferrite/austenite. By making use of the specific property of chromium, and allowing a similar composition metal type wire to contain this as an essential component, it is possible to refine the weld metal structure. This enables enhancement of the crack initiation resistance of the welded joint part on which attention is focused in the present invention. In order to in particular effectively enhance the characteristic, the Cr content is preferably set at 1.0 mass % or more. However, inclusion of the chromium in an amount exceeding 4.0 mass %, excessively, promotes the formation of residual austenite. This results in reduction of the low-temperature toughness itself, and the objective cryogenic characteristics in the present invention becomes unable to be obtained. Therefore, the upper limit of the content of chromium in the wire is set at 4.0 mass %.

[7. Other Components]

The welding wire can be allowed to contain aluminum in an amount of 0.1 mass % or less (not inclusive of 0%) as another component. Aluminum functions as a deoxidizer, and effectively acts for prevention of welding defects such as blow holes. For this reason, aluminum is preferably contained in the welding wire. However, inclusion in an excessive amount remarkably impairs the cracking resistance. Therefore, when aluminum is contained therein, the upper limit of the content thereof is set at 0.1 mass %.

Further, as a component to further note, mention may be made of boron. Any boron content is acceptable so long as it is 0.003 mass % or less.

The boron becomes a very harmful impurity in ensuring the low-temperature toughness at cryogenic temperatures when a welding wire having the foregoing components is used. When the boron content exceeds 0.003 mass %, the high-temperature cracking susceptibility increases, and in addition, the hardenability increases, and the low-temperature toughness sharply decreases. Even when the foregoing components other than boron are contained in a proper range, the high-temperature cracking resistance and the low-temperature toughness cannot be ensured unless the boron content satisfies the foregoing conditions. For this reason, the boron content is ideally set at substantially 0. However, generally, boron is included as an impurity in an iron type raw material such as electrolytic iron which is a main substance of the wire raw material. The content of boron in the raw material may exceed 0.02% even for electrolytic iron having the minimum impurity content. Thus, when a large amount of boron is included in the raw material, it is impossible to completely remove boron even if a high cleanliness dissolution process such as a vacuum degassing process is adopted. Under such circumstances, in order to minimize the adverse effect of boron, and to sufficiently keep the cryogenic characteristics, the upper limit of the content is preferably set at 0.003 mass % when boron is contained.

The balance other than the chemical components referred to and specified up to this point include, as described above, iron and inevitable impurities. As the inevitable impurities, for example, mention may be made of P, S, and the like.

Incidentally, for a welding method of a cryogenic steel using a similar composition metal type welding wire in accordance with the present invention, the oxygen content in a weld metal formed at the joint part after welding is required to be held at 100 ppm or less. From this necessity, a welding method suitable for this is desirably adopted. Namely, it is desirable to adopt, for example, a TIG welding method, or a MIG welding method mainly using an inert gas as a shield gas (such as a plasma MIG welding method or a coaxial multilayer wire process).

Whereas, cryogenic steels to be welded using the similar composition metal type welding wire of the present invention are not limited to the previously exemplified 9% nickel steel, but include various cryogenic steels including nickel steels containing nickel in an amount of 3.5 to 9.5%, such as a 5.5% nickel steel and a 3.5% nickel steel. Thus, such cryogenic steels produce similar effects.

EMBODIMENTS

Embodiment 1

Experimental Example of REM Addition

Using a 9% nickel steel base metal (plate thickness: 16 mm) including chemical components (mass % except for O=oxygen, balance: iron) shown in Table 1, processing of a groove in the shape shown in FIG. 1 was performed. Then, using each welding wire including chemical components (mass % except for O=oxygen, balance: iron and inevitable impurities) shown in Table 2, TIG welding was performed under the conditions A or B shown in Table 3. Incidentally, for welding, a fully automatic TIG welding apparatus equipped with an automatic arc control device was used. Welding was performed in the flat position.

TABLE 1

| C | Si | Mn | Ni | P | S | O |
|---|---|---|---|---|---|---|
| 0.05 | 0.29 | 0.38 | 9.1 | 0.005 | 0.004 | 20 ppm |

TABLE 2

| Wire No. | C | Si | Mn | P | S | Ni | Ti | REM | O | Al | B |
|---|---|---|---|---|---|---|---|---|---|---|---|
| 1' | 0.05 | 0.11 | 0.70 | 0.003 | 0.003 | 13.0 | — | — | 50 ppm | 0.002 | — |
| 2' | 0.06 | 0.13 | 0.65 | 0.004 | 0.005 | 10.5 | 0.008 | — | 85 ppm | 0.004 | — |
| 3' | 0.03 | 0.09 | 0.73 | 0.006 | 0.003 | 10.9 | 0.03 | — | 70 ppm | 0.020 | — |
| 4' | 0.09 | 0.14 | 0.75 | 0.004 | 0.002 | 13.7 | 0.12 | — | 60 ppm | 0.027 | — |
| 5' | 0.04 | 0.08 | 0.65 | 0.002 | 0.003 | 10.6 | — | 0.004 | 75 ppm | 0.048 | — |

TABLE 2-continued

| Wire No. | C | Si | Mn | P | S | Ni | Ti | REM | O | Al | B |
|---|---|---|---|---|---|---|---|---|---|---|---|
| 6' | 0.04 | 0.11 | 0.24 | 0.008 | 0.004 | 10.7 | — | 0.03 | 100 ppm | 0.033 | 0.002 |
| 7' | 0.03 | 0.10 | 0.49 | 0.005 | 0.002 | 10.8 | 0.08 | 0.01 | 40 ppm | 0.005 | — |
| 8' | 0.08 | 0.12 | 0.70 | 0.006 | 0.004 | 12.6 | — | 0.11 | 160 ppm | 0.002 | 0.002 |
| 9' | 0.03 | 0.09 | 0.40 | 0.005 | 0.003 | 10.9 | — | 0.05 | 70 ppm | 0.003 | — |
| 10' | 0.03 | 0.07 | 0.40 | 0.004 | 0.002 | 10.9 | — | 0.01 | 60 ppm | 0.002 | — |

TABLE 3

|  | Conditions A | Conditions B |
|---|---|---|
| Welding position | Flat | Flat |
| Current | 250 A | 340 A |
| Voltage | 12 V | 14 V |
| Welding speed | 6 cm/min | 6 cm/min |
| Rate of deposition | 15 g/min | 25 g/min |
| Shield gas | Pure argon | Pure argon |
| Interpass temperature | 20-150° C. | 20-150° C. |

Figure 2:
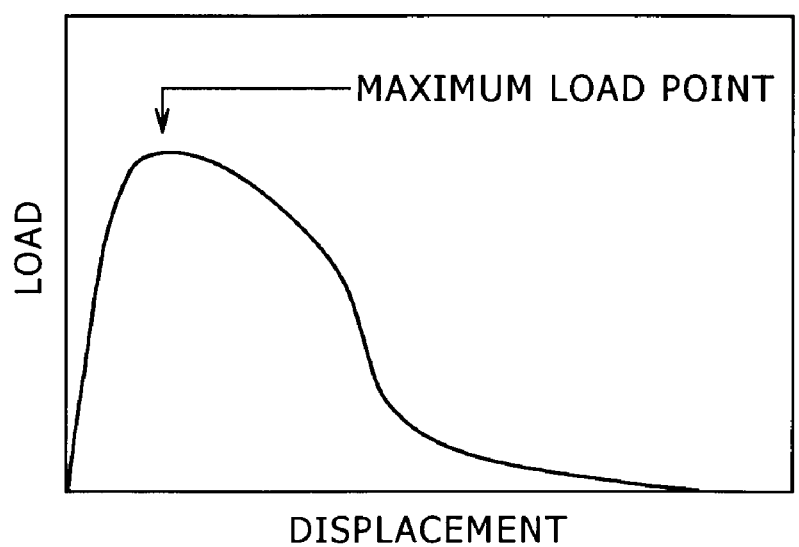
[FIG. 2] A schematic view showing the load-displacement curve resulting from the instrumented Charpy impact test.

After completion of welding, with a Charpy impact test piece according to JIS-Z-3112, No. 4, an instrumented Charpy impact test (using 300J instrumented Charpy impact tester, model: CAI-300D, manufactured by JT TOHSI INC.) was performed at a temperature of −196° C. Thus, the cryogenic characteristics of each test piece were evaluated. Incidentally, upon performing the instrumented Charpy impact test, there can be obtained a load-displacement curve indicating the relationship between the load to be imposed on a test piece by an impact blade and the displacement after contact of the impact blade with the test piece as shown in FIG. 2. With this testing method, not only the commonly obtainable absorption energy, but also the maximum load (the value of the load at a peak of the curve) by the load-displacement curve were measured. The maximum load corresponds to the load required for crack initiation during the impact test from the impact test start (the point at which all of load-displacement are 0). This means as follows. The larger this value is, the higher the strength required for crack initiation, i.e., the crack initiation resistance is.

Whereas, for evaluation, in both of the welding conditions A and B, 100 J was taken as a reference value for the absorption energy ($vE_{-196}$), and 25000 N was taken as a reference value for the crack initiation resistance (maximum load).

These test results are shown in Table 4. In Table 4, in the column of the impact test results, the measured values of the absorption energy ($vE_{-196}$) and the crack initiation resistance (maximum load) are shown. In addition, when these values are equal to, or more than the respective reference values, AA is appended, or when these values are less than the respective reference values, CC is appended, to the right end of the numerals of each measured value. Then, in the column of evaluation, for each of the welding conditions A and B, when the absorption energy and the crack initiation resistance are both equal to, or more than the respective reference values, AA is shown as being acceptable, or when they are less than the respective reference values, CC is shown as being unacceptable. Further, when the absorption energy and the crack initiation resistance are both equal to, or more than the respective reference values under both of the welding conditions A and B, each corresponding welding wire was finally determined as being acceptable, and AA is shown in the column of the comprehensive evaluation. Whereas, when both of, or any one of the welding conditions A and B provided measured values of less than the reference values, each corresponding welding wire was finally determined as being unacceptable, and CC is shown in the column of the comprehensive evaluation.

TABLE 4

| Test No. | Welding wire No. | Welding conditions | Oxygen in weld metal (ppm) | Impact test results | | Evaluation | | Remarks |
|---|---|---|---|---|---|---|---|---|
| | | | | $vE_{-196}$ (J) | Maximum load (N) | AA: acceptable CC: unacceptable | Comprehensive evaluation | |
| 1 | 1' | A | 5 | 233AA | 24061CC | CC | CC | Comparative |
| 2 | | B | 7 | 188AA | 24655CC | CC | | Example |
| 3 | 2' | A | 46 | 197AA | 24322CC | CC | CC | Comparative |
| 4 | | B | 54 | 164AA | 24689CC | CC | | Example |
| 5 | 3' | A | 22 | 145AA | 26072AA | AA | CC | Comparative |
| 6 | | B | 19 | 81CC | 26097AA | CC | | Example |
| 7 | 4' | A | 33 | 47CC | 23879CC | CC | CC | Comparative |
| 8 | | B | 29 | 35CC | 24066CC | CC | | Example |
| 9 | 5' | A | 46 | 201AA | 24149CC | CC | CC | Comparative |
| 10 | | B | 42 | 158AA | 24331CC | CC | | Example |
| 11 | 6' | A | 55 | 148AA | 26427AA | AA | AA | Example |
| 12 | | B | 68 | 126AA | 26852AA | AA | | |
| 13 | 7' | A | 28 | 121AA | 26247AA | AA | AA | Example |
| 14 | | B | 31 | 106AA | 26071AA | AA | | |
| 15 | 8' | A | 79 | 45CC | 24198CC | CC | CC | Comparative |
| 16 | | B | 72 | 31CC | 24227CC | CC | | Example |
| 17 | 9' | A | 49 | 94CC | 24365CC | CC | CC | Comparative |
| 18 | | B | 55 | 88CC | 24245CC | CC | | Example |
| 19 | 10' | A | 32 | 136AA | 25370AA | AA | AA | Example |
| 20 | | B | 66 | 113AA | 25219AA | AA | | |

The test Nos. 11 to 14, and 19 and 20 of Table 4 are examples in each of which the chemical components of the welding wire satisfy the scope of the present invention. In any case of the welding conditions A and B, the $vE_{-196}$ exceeds 100 J assumed as the reference value, indicating a sufficient low-temperature toughness. Further, the maximum load during the impact test also largely exceeds 25000 N assumed as the reference value, indicating that each sample has a high crack initiation resistance (crack inhibiting strength). Therefore, all the wires Nos. 6, 7, and 10 corresponding to these test Nos. 11 to 14, 19, and 20 were finally rated as being acceptable in terms of comprehensive evaluation thereof. Incidentally, the wires Nos. 6 and 10 are examples corresponding to the present invention (1), and the wire No. 7 is an example corresponding to the present invention (2).

On the other hand, all of the test Nos. 1 to 10, and Nos. 15 to 18 of Table 4 are Comparative Examples in each of which the chemical components of the welding wire do not satisfy the scope of the present invention. Wires Nos. 1 to 5, and 8 to 9 were all rated as unacceptable in terms of the final comprehensive evaluation. Each sample has the following problems. Namely, for the test Nos. 1 and 2, it has been confirmed as follows. A REM is not contained therein, and hence, the low-temperature toughness exceeds the reference value, and each sample has the sufficient characteristic. However, the crack initiation resistance is less than the reference value. Whereas, for the test Nos. 3 and 4, Ti is contained, but a REM is not contained. For this reason, as with the test Nos. 1 and 2, the low-temperature toughness is sufficient, but the crack initiation resistance does not reach the reference value. The test Nos. 5 and 6 are, as with the test Nos. 3 and 4, examples in which Ti is contained, but a REM is not contained. However, Ti is contained in an amount of about 0.03%, and hence under the welding conditions A (test No. 5), the low-temperature toughness and the crack initiation resistance both reach the references of the present invention. However, for these, the following has been shown: under the welding conditions B (test No. 6), the crack initiation resistance is equal to, or more than the reference value, but the low-temperature toughness does not reach the reference value. Therefore, the wire No. 3 corresponding to the test Nos. is rated as unacceptable in terms of comprehensive evaluation. As for the test Nos. 7 and 8, it has been confirmed as follows: titanium is contained in a large amount, and hence both of the low-temperature toughness and the crack initiation resistance are lower than the respective reference values. Whereas, for the test Nos. 9 and 10, the REM content is lower than the lower limit of the scope of the present invention. This results in a low-temperature toughness of equal to, or more than the reference value, but a crack initiation resistance of lower than the reference value. Further, test Nos. 15 to 18 are the cases where the REM content is excessive, and it has been shown that the low-temperature toughness and the crack initiation resistance are both lower than the respective reference values.

Embodiment 2

Experimental Example of Chromium Addition

Using a 9% nickel steel base metal (plate thickness: 16 mm) including chemical components (mass % except for O=oxygen, balance: iron) shown in Table 5, processing of a groove in the shape shown in FIG. 1 was performed in the same manner as in Embodiment 1. Then, using each welding wire including chemical components (mass % except for O=oxygen, balance: iron) shown in Table 6, TIG welding was performed under the conditions A or B shown in Table 3 in the same manner as in Embodiment 1. Incidentally, for welding, a fully automatic TIG welding apparatus equipped with an automatic arc control device was used. Welding was performed in the flat position.

TABLE 5

| C | Si | Mn | Ni | P | S | O |
|---|---|---|---|---|---|---|
| 0.06 | 0.35 | 0.41 | 8.9 | 0.004 | 0.005 | 25 ppm |

TABLE 6

| Wire No. | C | Si | Mn | P | S | Ni | Cr | O | Al | B |
|---|---|---|---|---|---|---|---|---|---|---|
| 1' | 0.04 | 0.12 | 0.55 | 0.004 | 0.002 | 12.0 | — | 60 ppm | 0.006 | 0.002 |
| 2' | 0.03 | 0.09 | 0.48 | 0.003 | 0.006 | 11.8 | 1.9 | 50 ppm | 0.003 | — |
| 3' | 0.04 | 0.07 | 0.76 | 0.006 | 0.004 | 10.1 | 4.7 | 43 ppm | 0.026 | — |
| 4' | 0.09 | 0.12 | 0.70 | 0.006 | 0.004 | 13.7 | 5.3 | 140 ppm | 0.038 | 0.002 |

After completion of welding, in the same manner as in Embodiment 1, with a Charpy impact test piece according to JIS-Z-3112, No. 4, an instrumented Charpy impact test (using 300J instrumented Charpy impact tester, model: CAI-300D, manufactured by JT TOHSI INC.) was performed at a temperature of −196° C. Thus, the cryogenic characteristics of each test piece were evaluated. Incidentally, the maximum load (the value of the load at a peak of the curve) was also measured by the load-displacement curve in the same manner as in Embodiment 1.

Further, for evaluation, in the same manner as in Embodiment 1, under both of the welding conditions A and B, 100 J was taken as a reference value for the absorption energy ($vE_{-196}$), and 25000 N was taken as a reference value for the crack initiation resistance (maximum load). The test results are shown in Table 7.

TABLE 7

| Test No. | Welding wire No. | Welding conditions | Oxygen in weld metal (ppm) | Impact test results vE$_{-196}$ (J) | Maximum load (N) | Evaluation AA: acceptable CC: unacceptable | Comprehensive evaluation | Remarks |
|---|---|---|---|---|---|---|---|---|
| 1 | 1' | A | 10 | 215AA | 24178CC | CC | CC | Comparative Example |
| 2 |  | B | 9 | 176AA | 24462CC | CC |  | Comparative Example |
| 3 | 2' | A | 15 | 117AA | 28544AA | AA | AA | Example |
| 4 |  | B | 18 | 105AA | 29091AA | AA |  | Example |
| 5 | 3' | A | 25 | 116AA | 29199AA | AA | CC | Comparative Example |
| 6 |  | B | 19 | 53CC | 28622AA | CC |  | Comparative Example |
| 7 | 4' | A | 86 | 47CC | 25178AA | CC | CC | Comparative Example |
| 8 |  | B | 79 | 34CC | 25061AA | CC |  | Comparative Example |

From the results shown in Table 7, it can be considered as follows. The test Nos. 3 and 4 are examples in each of which the chemical components of the welding wire satisfy the scope of the present invention. The vE$_{-196}$ exceeds 100 J assumed as the reference value, indicating a sufficient low-temperature toughness. In addition, the maximum load during the impact test also largely exceeds 25000 N assumed as the reference value, indicating that each sample has a high crack initiation resistance (crack inhibiting strength). On the other hand, the test Nos. 1, 2, and 5 to 8 are all comparative examples in each of which the chemical components of the welding wire do not satisfy the scope of the present invention, and respectively have the following problems. Namely, for the test Nos. 1 and 2, it has been shown as follows. The low-temperature toughness exceeds the reference value, and each sample has the sufficient characteristic. However, Cr is not contained therein, so that the crack initiation resistance is considerably lower than the reference value. Whereas, for the test Nos. 5 and 6, the crack initiation resistance has reached the reference value, and the low-temperature toughness under the welding conditions A has also reached the reference value. However, the Cr content is a little more than the upper limit of the scope of the present invention. Accordingly, for the low-temperature toughness under the welding conditions B, the low-temperature toughness is lower than the reference value. As for the test Nos. 7 and 8, the Cr content is considerably more than the upper limit of the scope of the present invention. Accordingly, the low-temperature toughness has been further reduced to be lower than the reference value not depending upon the welding conditions (quantity of heat input).

As also verified from the foregoing Embodiments, by applying the similar composition metal type welding solid wire in accordance with the present invention to welding of the cryogenic steel, it is possible to impart excellent cryogenic characteristics such as having a sufficient low-temperature toughness and being high in crack initiation resistance even under a cryogenic temperature of −196° C., to the welded joint after welding. Thus, the advantageous effects according to the present invention are apparent.

As described up to this point, the present invention was described in details and by reference to specific embodiments. However, it will be obvious to those skilled in the art that various changes and modifications may be added without departing from the spirit and scope of the present invention. The present application is based on Japanese patent application (JP-A No. 2007-262452) filed on Oct. 5, 2007, and Japanese patent application (JP-A No. 2007-262453) filed on Oct. 5, 2007, the contents of which are hereby incorporated by reference.

The invention claimed is:

1. A cryogenic welding wire comprising:
    carbon in an amount greater than zero and less than or equal to 0.10 mass %,
    silicon in an amount greater than zero and less than or equal to 0.15 mass %,
    nickel in an amount of from 8.0 to 15.0 mass %,
    manganese in an amount of from 0.10 to 0.80 mass %,
    aluminum in an amount greater than zero and less than or equal to 0.1 mass %,
    REM in an amount of from 0.005 to 0.040 mass %,
    oxygen in an amount of from 150 ppm or less, and
    the balance being iron and inevitable impurities.

2. The cryogenic welding wire according to claim 1, further comprising titanium in an amount greater than zero and less than or equal to 0.10 mass %.

3. A cryogenic weld metal formed by welding a cryogenic base metal with the cryogenic welding wire according to claim 1.

4. The cryogenic weld metal according to claim 3, wherein the cryogenic base metal is a cryogenic steel comprising nickel in an amount of from 3.5 to 9.5 mass %.

5. The cryogenic weld metal according to claim 3, wherein the cryogenic base metal is a cryogenic steel comprising nickel in an amount of from 5.5 to 9.5 mass %.

6. The cryogenic weld metal according to claim 3, wherein the cryogenic base metal is a cryogenic steel comprising nickel in an amount of from 9 to 9.5 mass %.

7. A cryogenic welding wire comprising:
    carbon in an amount greater than zero and less than or equal to 0.10 mass %,
    silicon in an amount greater than zero and less than or equal to 0.15 mass %,
    nickel in an amount of from 8.0 to 15.0 mass %,
    manganese in an amount of from 0.10 to 0.80 mass %,
    chromium in an amount greater than zero and less than or equal to 4.0 mass %,
    40 ppm≦oxygen≦150 ppm, and
    the balance being iron and inevitable impurities.

8. A cryogenic weld metal formed by welding a cryogenic base metal with the cryogenic welding wire according to claim 7.

9. The cryogenic welding wire according to claim 1, further comprising boron in an amount greater than zero and less than or equal to 0.003 mass %.

10. The cryogenic weld metal according to claim 8, wherein the cryogenic base metal is a cryogenic steel comprising nickel in an amount of from 3.5 to 9.5 mass %.

11. The cryogenic weld metal according to claim 8, wherein the cryogenic base metal is a cryogenic steel comprising nickel in an amount of from 5.5 to 9.5 mass %.

12. The cryogenic weld metal according to claim 8, wherein the cryogenic base metal is a cryogenic steel comprising nickel in an amount of from 9 to 9.5 mass %.

13. A cryogenic welding wire comprising:
carbon in an amount greater than zero and less than or equal to 0.10 mass %,
silicon in an amount greater than zero and less than or equal to 0.15 mass %,
nickel in an amount of from 8.0 to 15.0 mass %,
manganese in an amount of from 0.48 to 0.80 mass %,
boron in an amount of from 0.002 to 0.003 mass %,
aluminum in an amount greater than zero and less than or equal to 0.1 mass %,
REM in an amount of from 0.005 to 0.040 mass %,
oxygen in an amount of from 150 ppm or less, and
the balance being iron and inevitable impurities.

14. A cryogenic weld metal formed by welding a cryogenic base metal with the cryogenic welding wire according to claim 13.

15. The cryogenic weld metal according to claim 14, wherein the cryogenic base metal is a cryogenic steel comprising nickel in an amount of from 3.5 to 9.5 mass %.

16. The cryogenic weld metal according to claim 14, wherein the cryogenic base metal is a cryogenic steel comprising nickel in an amount of from 5.5 to 9.5 mass %.

17. The cryogenic weld metal according to claim 14, wherein the cryogenic base metal is a cryogenic steel comprising nickel in an amount of from 9 to 9.5 mass %.

* * * * *